United States Patent
Kim (10) Patent No.: US 6,704,074 B2
(45) Date of Patent: Mar. 9, 2004

(54) METHOD OF FABRICATING LIQUID CRYSTAL DISPLAY DEVICE

(75) Inventor: Young Ho Kim, Taegu (KR)

(73) Assignee: LG.Philips LCD Co., LTD, Seoul (KR)

( * ) Notice: Subject to any disclaimer, the term of this patent is extended or adjusted under 35 U.S.C. 154(b) by 281 days.

(21) Appl. No.: 09/756,883

(22) Filed: Jan. 10, 2001

(65) Prior Publication Data

US 2001/0015779 A1 Aug. 23, 2001

(30) Foreign Application Priority Data

Jan. 13, 2000 (KR) .................................... P2000-1542

(51) Int. Cl.$^7$ ................................................ G02F 1/13
(52) U.S. Cl. ..................................................... 349/106
(58) Field of Search ........................................ 349/106

(56) References Cited

U.S. PATENT DOCUMENTS

| | | | | |
|---|---|---|---|---|
| 5,568,293 A | * | 10/1996 | Takao et al. ................. | 349/106 |
| 5,689,318 A | * | 11/1997 | Matsuyama et al. ......... | 349/106 |
| 6,183,917 B1 | * | 2/2001 | Sakamoto et al. ............. | 430/7 |
| 6,392,728 B2 | * | 5/2002 | Tanaka et al. ............... | 349/106 |
| 6,399,257 B1 | * | 6/2002 | Shirota et al. ................. | 430/7 |

* cited by examiner

*Primary Examiner*—James Dudek
(74) *Attorney, Agent, or Firm*—Mckenna Long & Aldridge LLP (57) ABSTRACT

A method of fabricating a liquid crystal display device includes forming a black matrix on a first substrate and forming a color resist on the first substrate and the black matrix. An oxygen shielding film is formed on the color resist. Red, green and blue color filters each having at least one side portion having a slope of about 20 degrees or less, the color filters being formed by curing portions of the color resist with an ultraviolet ray using a photomask, the slope of the one side portion of the first color filter ending at a first position on the black matrix and the slope of the one side portion of the second color filter ending at a second position on the black matrix, the first position being spaced from the second position. A common electrode is formed over the color filters and an alignment layer is formed on the substrate.

12 Claims, 9 Drawing Sheets

METHOD OF FABRICATING LIQUID CRYSTAL DISPLAY DEVICE

This application claims the benefit of Korean Patent Application No. 2000-1542, filed on Jan. 13, 2000, the entirety of which is hereby incorporated by reference.

BACKGROUND OF THE INVENTION

1. Field of the Invention

The present invention relates to a method of fabricating a liquid crystal display device, and more particularly, to a method of forming color filters on a substrate of the liquid crystal display.

2. Discussion of the Related Art

Generally, a liquid crystal display (LCD) of an active matrix driving system uses thin film transistors (TFT's) as switching devices to display a moving picture. Since such an LCD can be made smaller in size than the existing cathode ray tube (CRT) it has been widely used for a monitor for a personal computer or a notebook computer as well as an office automation equipment (e.g., a copy machine) and a portable device (e.g., a cellular phone or a pager).

A process of fabricating such an active matrix LCD includes substrate cleaning, substrate manufacturing, substrate adhesion/liquid crystal injection and packaging steps. The substrate manufacturing step is divided into manufacturing a color filter substrate and manufacturing a thin film transistor substrate.

Figure 1A:
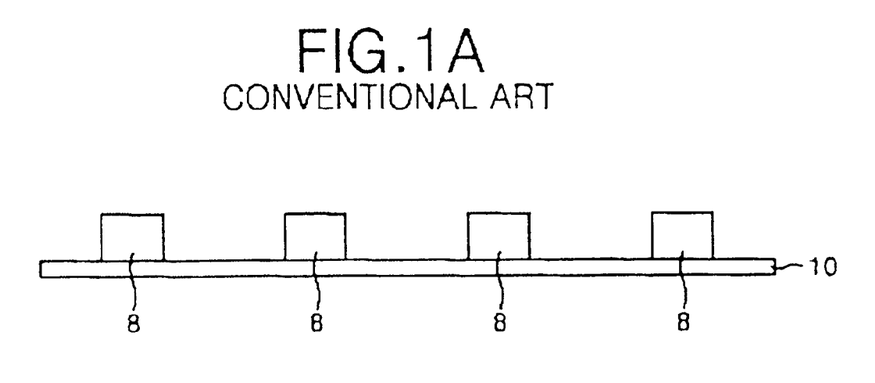
FIG. 1A to FIG. 1D are section views showing a conventional method of manufacturing a color filter substrate.
Figure 1B:
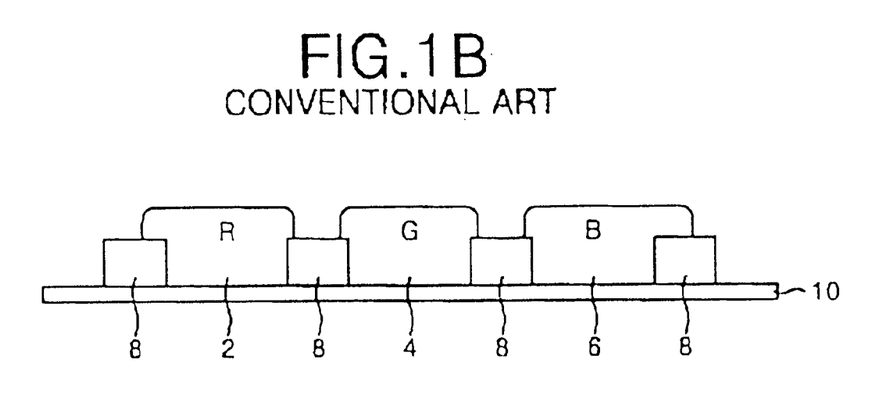
Figure 1C:
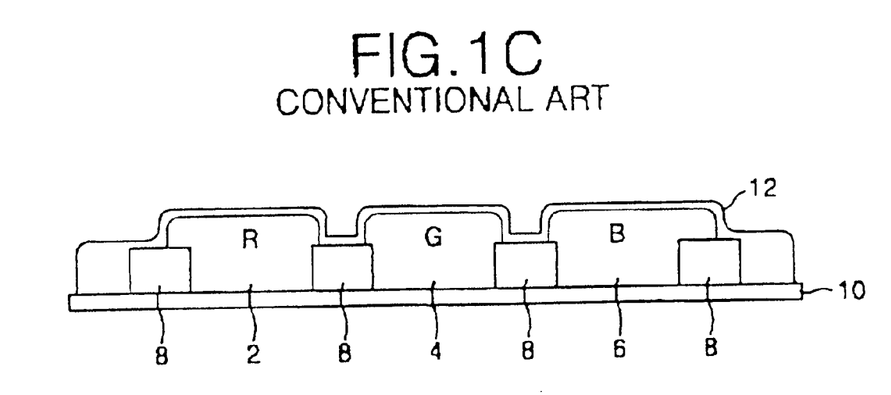
Figure 1D:
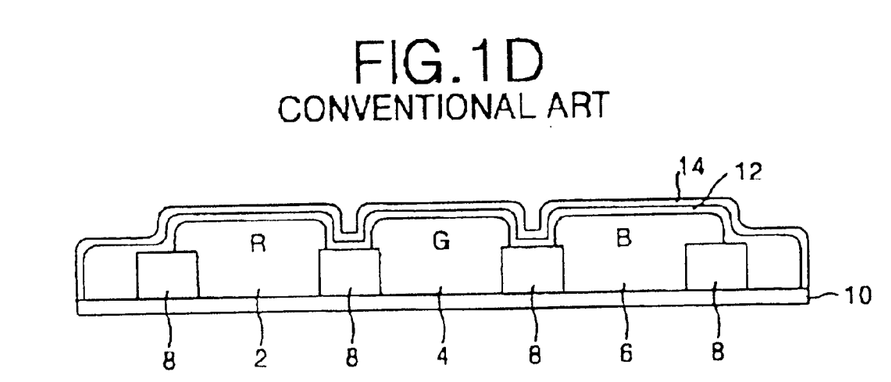

FIGS. 1A to FIG. 1D illustrate a conventional method of manufacturing a color filter substrate. Referring to FIGS. 1A to 1D, the conventional color filter substrate manufacturing method includes forming a black matrix 8 on an upper substrate 10, forming red (R), green (G) and blue (B) color filters 2, 4, and 6, forming a common electrode 12, and forming an alignment film 14. The black matrix 8 is formed on the upper substrate 10, as shown in FIG. 1A, to prevent an optical interference among the adjacent red, green, and blue color filters 2, 4, and 6. The black matrix 8 is positioned at each boundary portion of the color filters 2, 4, and 6, as shown in FIG. 1B. Such color filters 2, 4, and 6 transmit light having a specific wavelength band to display red, green, and blue colors. The common electrode 12 is entirely deposited on the color filters 2, 4, and 6, as shown in FIG. 1C. The alignment film 14 is entirely formed on the common electrode 12, as shown in FIG. 1D. The alignment film 14 is usually made from polyimide.

Figure 2A:
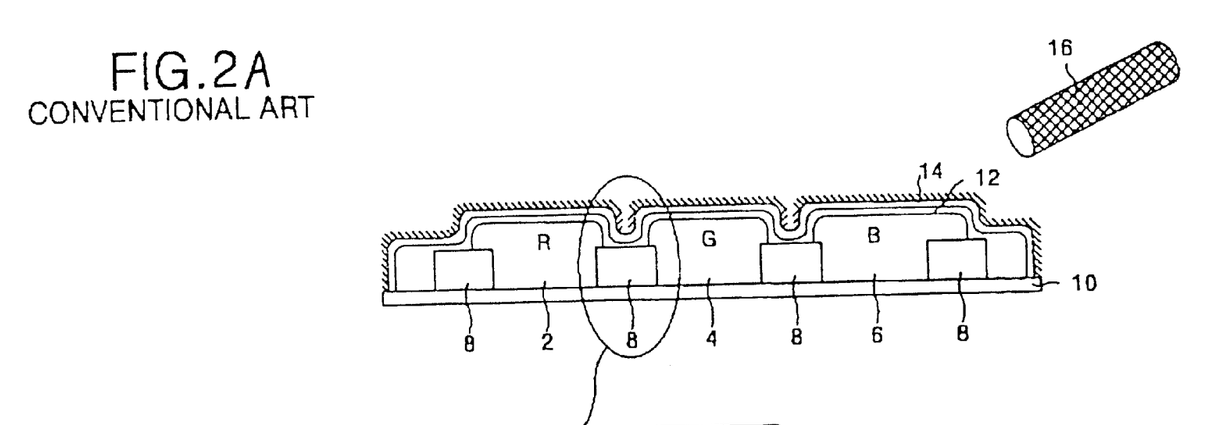
FIGS. 2A and 2B are section views showing a rubbing problem caused by a step coverage of the conventional color filter.
Figure 2B:
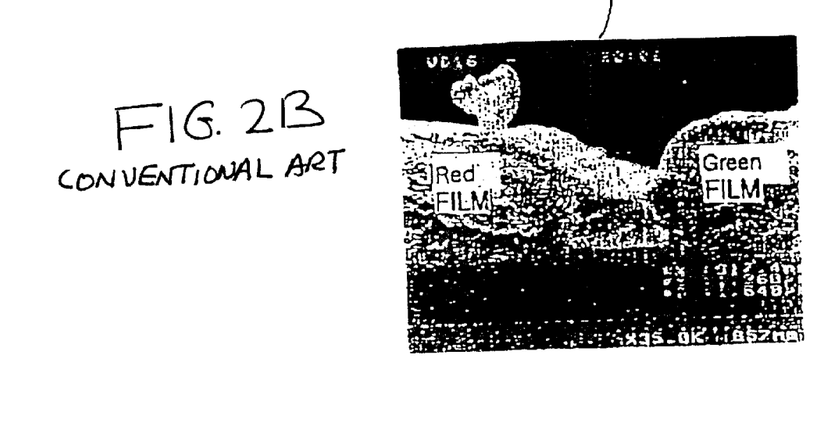
Figure 3:
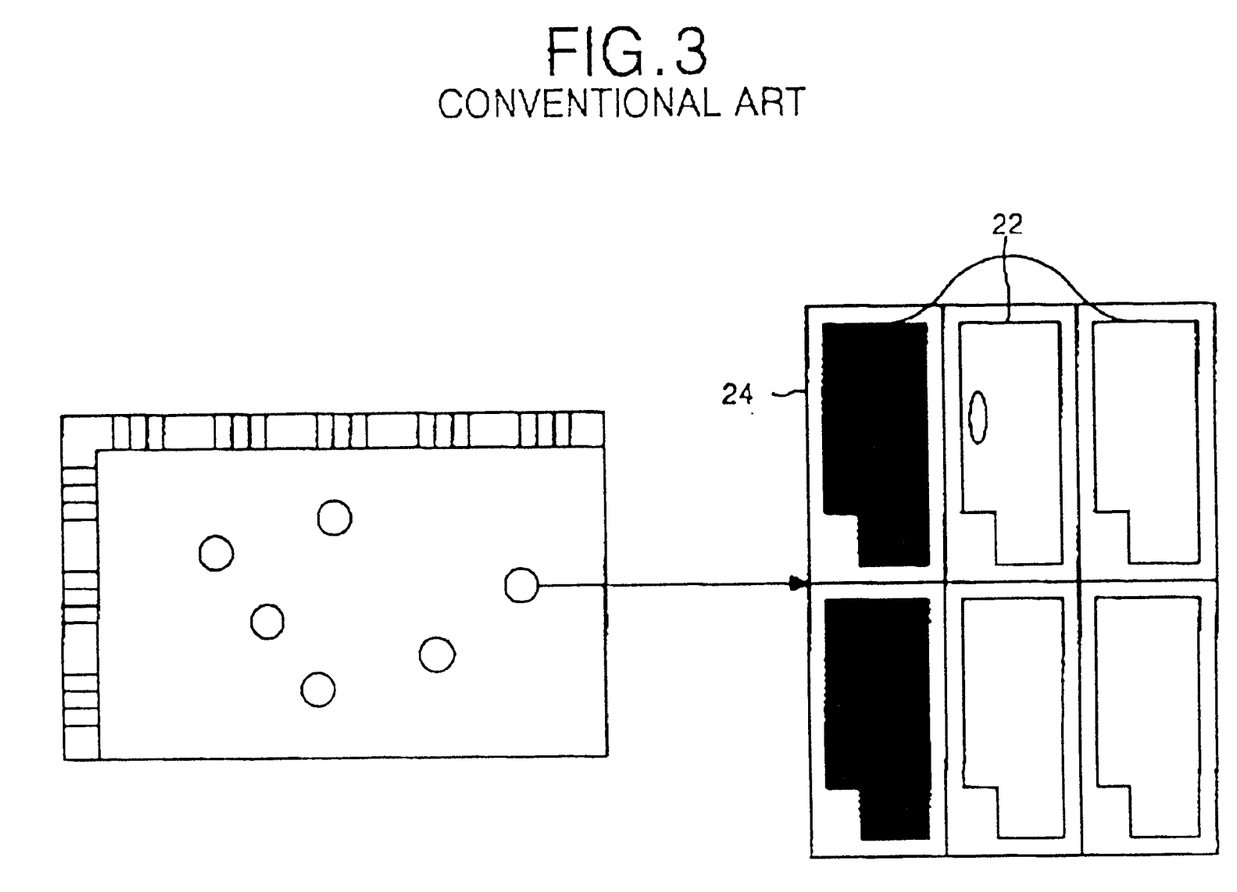
FIG. 3 is a plan view showing a pixel cell problem caused by a step coverage in the conventional color filter.

However, the conventional color filter substrate manufacturing method has a problem in that a domain defect differentiating an alignment direction of a liquid crystal is generated at an alignment film 14 formed on the boundary portion between the color filters 2, 4, and 6. This is due to a step coverage between the black matrix 8 and the color filter 2, 4, or 6. More specifically, if a slope of the step coverage of the color filter is close to 90°, the alignment film 14 has a concave shape at the black matrix portion. Also, a rubbing problem results, as shown in FIGS. 2A and 2B. In other words, in the course of the rubbing process, liquid crystal molecules positioned at the step coverage of the color filter become aligned in a direction different from an alignment direction of most liquid crystal molecules. As a result, a domain defect (i.e., reverse tilt) is generated at a place corresponding to the step coverage of the color filter on the substrate consisting of a plurality of pixel cells 22 as shown in FIG. 3.

SUMMARY OF THE INVENTION

Accordingly, the present invention is directed to a method of fabricating a liquid crystal display that substantially obviates one or more of the problems due to limitations and disadvantages of the related art.

An advantage of the present invention is a method of fabricating a liquid crystal display, wherein a slope of a step coverage of a color filter is reduced so as to prevent rubbing problems.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method of fabricating a liquid crystal display device includes forming color filters on an upper substrate such that a slope of a step coverage existing at each boundary portion between the color filters is less than a desired angle; and forming an alignment film on the color filters.

In another aspect of the present invention, a method of fabricating a liquid crystal display device comprises forming a black matrix on a first substrate; forming a color resist on the first substrate and the black matrix; forming an oxygen shielding film on the color resist; forming first, second and third color filters each having at least one side portion having a slope of about 20 degrees or less; and forming a common electrode over the color filters.

In another aspect of the present invention, a method of fabricating a liquid crystal display device comprises forming a black matrix on a first substrate; forming a color resist on the first substrate and the black matrix; forming an oxygen shielding film on the color resist; forming red, green and blue color filters each having at least one side portion having a slope of about 20 degrees or less, the color filters being formed by curing portions of the color resist with an ultraviolet ray using a photomask, wherein the slope of the one side portion of the first color filter ends at a first position on the black matrix and the slope of the one side portion of the second color filter ends at a second position on the black matrix, the first position being spaced from the second position; forming a common electrode over the color filters; and forming an alignment layer on the substrate.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiment of the present invention, example of which is illustrated in the accompanying drawings.

Figure 4A:
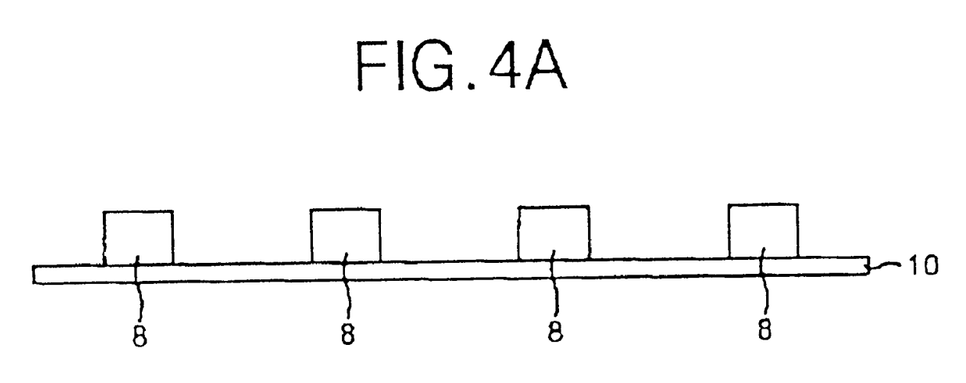
FIG. 4A to FIG. 4H are section views showing a method of manufacturing a color filter substrate according to an embodiment of the present invention.
Figure 4B:
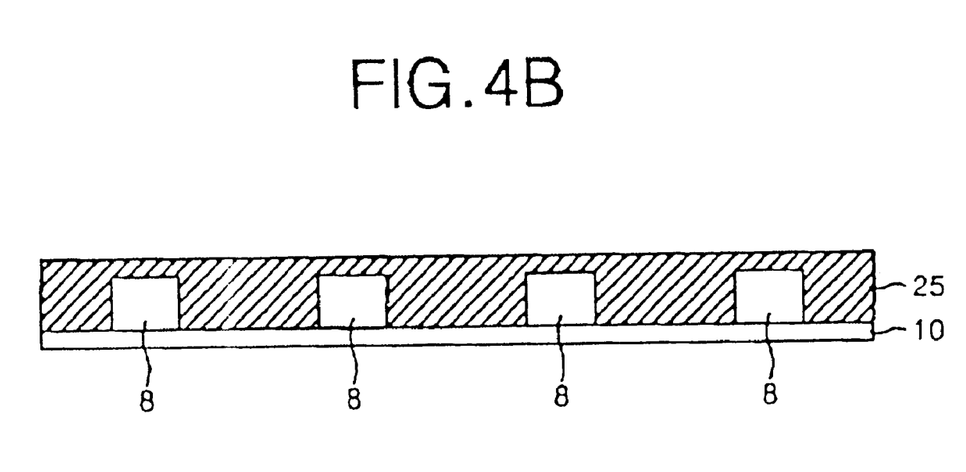

FIG. 4A to FIG. 4H illustrate a method of manufacturing a color filter substrate according to an embodiment of the present invention. Referring to FIGS. 4A to 4H, the color filter substrate manufacturing method includes a step of forming a black matrix 8 on an upper substrate 10, forming red (R), green (G), and blue (B) color filters 26, 28, and 30, forming a common electrode 32, and forming an alignment film 34. The black matrix 8 is formed on the upper substrate 10, as shown in FIG. 4A, to prevent an optical interference among the adjacent red, green, and blue color filters 26, 28, and 30. In order to form the three color filters (i.e. red, green, and blue color filters) 26, 28 and 30 on the upper substrate 10 provided with the black matrix 8, a color resist 25 having any one of the three colors (i.e., red, green and blue colors) is coated on the upper substrate 10, as shown in FIG. 4B.

Figure 4C:
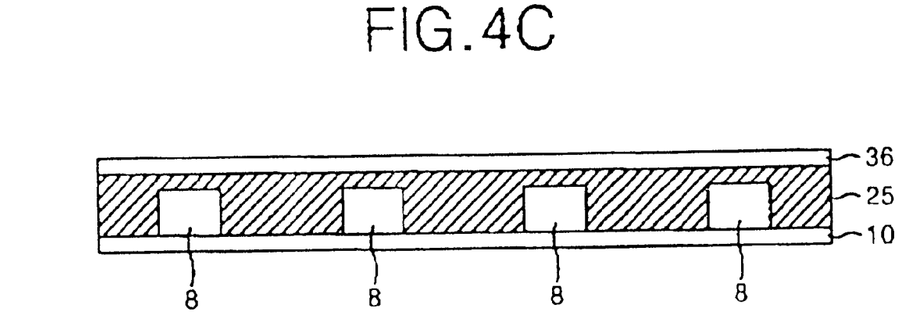
Figure 4D:
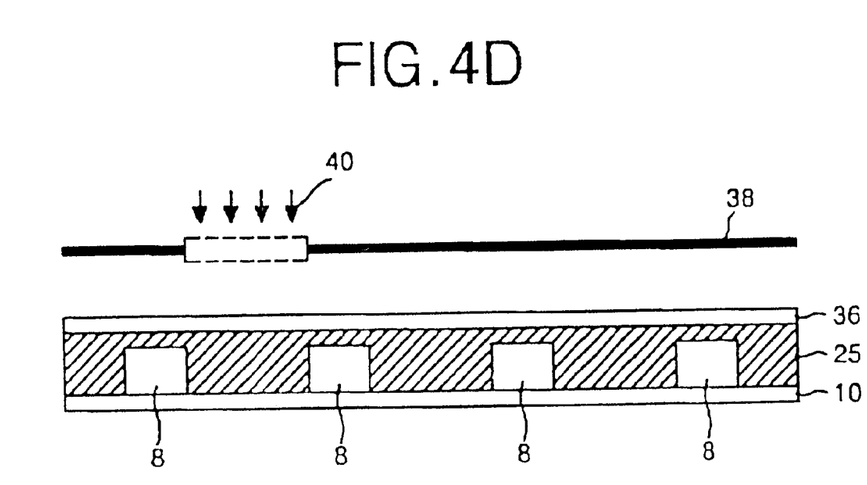
Figure 4E:
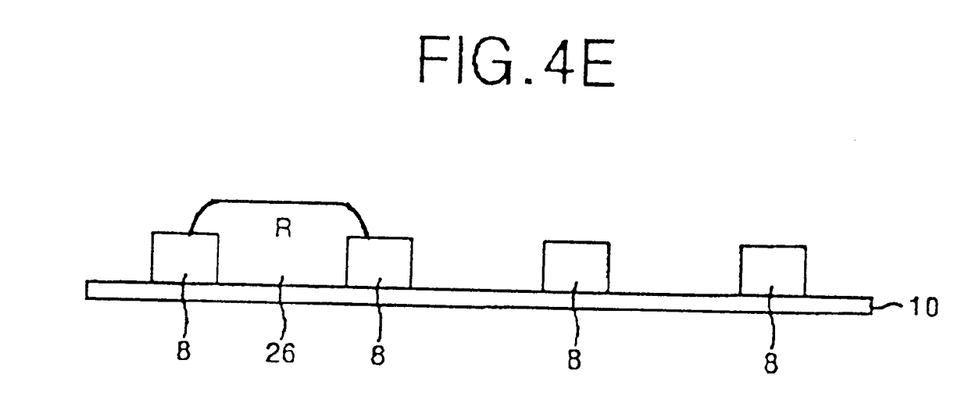
Figure 4F:
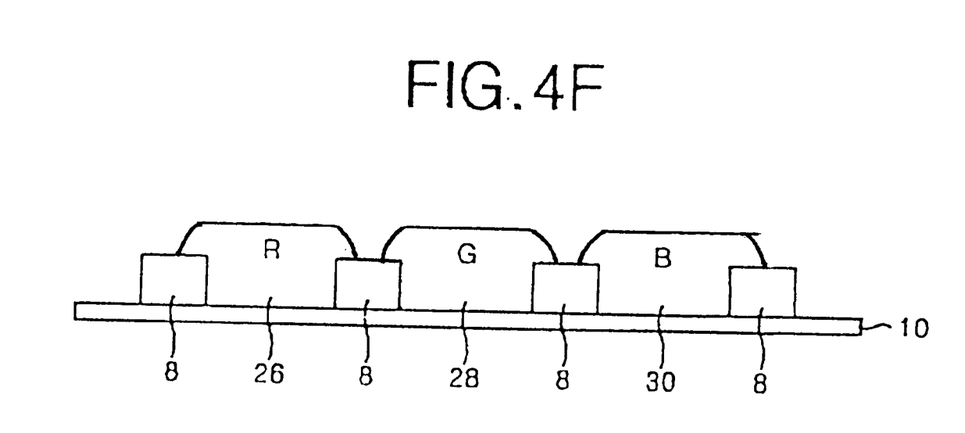
Figure 4G:
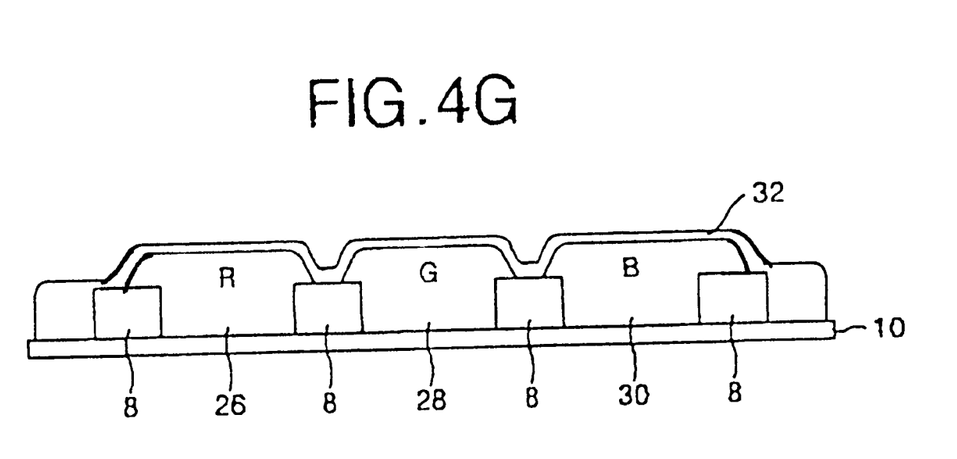
Figure 4H:
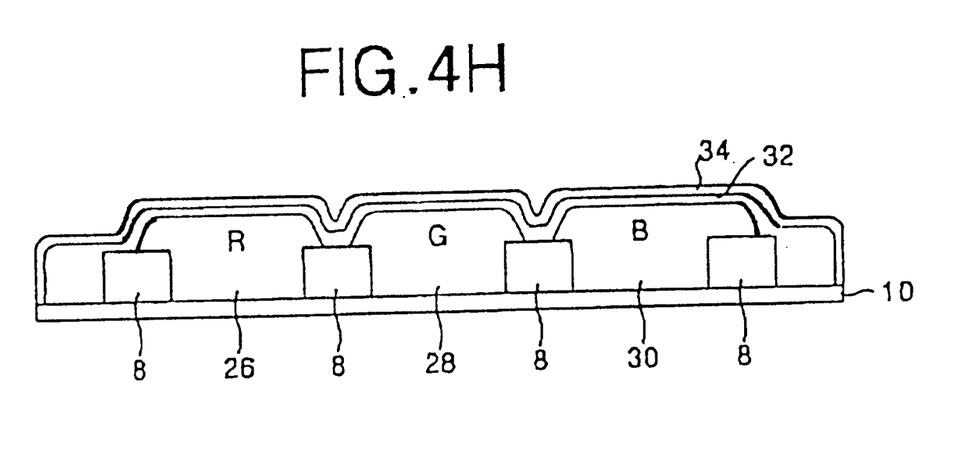
Figure 5:
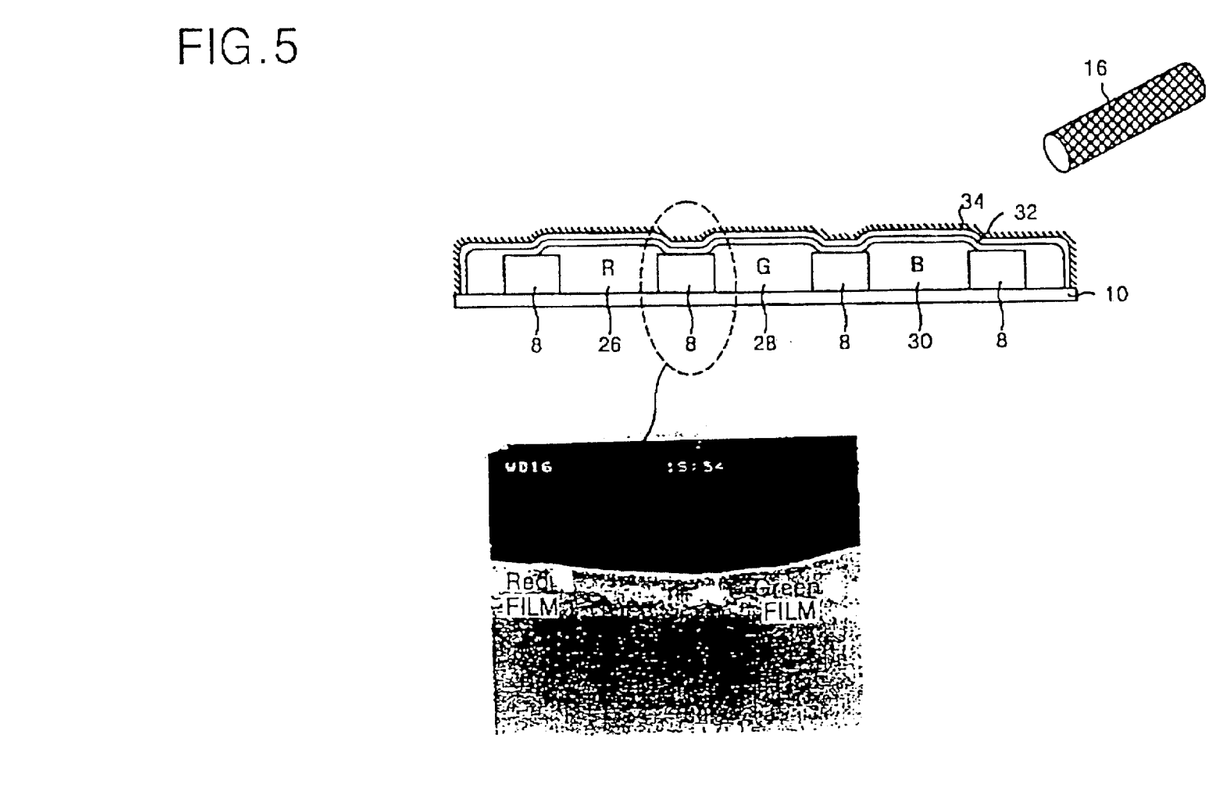
FIG. 5 is a section view showing the color filter substrate in FIG. 4H after the rubbing process.

As shown in FIGS. 4C and 4D, an oxygen shielding film 36 is coated on the upper substrate 10 entirely coated with the color resist 25, and only a portion to be used as the color filter is cured by an ultraviolet ray 40 using a photo mask 38. The oxygen shielding film 36 should be omitted. At this time, the color resist 25 is exposed and developed such that the black matrix 8 is located at each boundary portion of the color filter to be formed on the upper substrate 10. A step coverage of the color filter preferably has a slope of less than 20°. In other words, the color filters are formed on the upper substrate 10, as shown in FIG. 4E. The three (red, green, and blue) color filters 26, 28, and 30 are formed on the upper substrate 10 in this manner, as shown in FIG. 4F. The color filters 26, 28, and 30 transmit a specific band of light to display red, green, and blue colors. The common electrode 32 is entirely deposited onto the color filters 26, 28, and 30, as shown in FIG. 4G. The alignment film 34 is entirely formed on the common electrode 32, as shown in FIG. 4H. The alignment film 34 is usually made from polyimide. After the alignment film 34 was formed, the upper substrate is rubbed by means of a rubbing bar 16, as shown in FIG. 5.

Accordingly, a slope close to 90° at the boundary portion of the color filter in the course of fabricating the liquid crystal display is now reduced to less than 20°, thereby preventing the rubbing problem.

As described above, the liquid crystal display fabricating method according to the present invention has an advantage in that a slope close to a right angle at the boundary portion of the color filter is reduced to a slow slope to prevent the rubbing problem.

It will be apparent to those skilled in the art that various modifications and variation can be made in the drawings of the present invention without departing from the spirit or scope of the invention. Thus, it is intended that the present invention covers the modifications and variations of this invention provided they come within the scope of the appended claims and their equivalents.

What is claimed is:

1. A method of fabricating a liquid crystal display device comprising:

forming a black matrix on a first substrate;

forming a color resist on the first substrate and the black matrix;

forming first, second and third color filters each having at least one side portion having a slope of about 20 degrees or less; and forming a common electrode over the color filter, wherein the slope of the one side portion of a first of the color filters ends at a first position on the black matrix and the slope of the one side portion of a second of the color filters ends at a second position on the black matrix, the first position spaced from the second position.

2. The method of claim 1, further comprising forming an alignment layer on the substrate.

3. The method of claim 2, wherein the alignment layer is formed of a polyimide.

4. The method of claim 1, wherein the color filters are formed by curing portions of the color resist with an ultraviolet ray using a photomask.

5. The method of claim 1, further comprising forming an oxygen shielding film on the color resist.

6. A method of fabricating a liquid crystal display device comprising:

forming a first alignment layer on a first substrate;

forming a black matrix on a second substrate;

forming a color filter layer having multiple color filters on the second substrate, wherein a slope of a step coverage of at least one of the color filters is about 20 degrees or less; and forming a second alignment layer between the first and second substrates, wherein the slope of the first side portion of the color filter ends at a first position on the black matrix and the slope of the second side portion of the color filter ends at a second position on the black matrix, wherein the first position is spaced from the second position.

7. The method of claim 6, wherein each of the multiple color filters of the color filter layer each have a slope of a step coverage of about 20 degrees or less.

8. The method of claim 6, wherein the black matrix is formed at a boundary of the multiple color filters.

9. The method of claim 6, wherein the multiple color filters include red, green and blue color filters.

10. A method of fabricating a liquid crystal display device comprising:

forming a black matrix on a first substrate;

forming a color resist on the first substrate and the black matrix;

forming red, green and blue color filters each having at least one side portion having a slope of about 20 degrees or less, the color filters being formed by curing portions of the color resist with an ultraviolet ray using a photomask, wherein the slope of the one side portion of a first of the color filters ends at a first position on the black matrix and the slope of the one side portion of a second of the color filters ends at a second position on the black matrix, wherein the first position is spaced from the second position;

forming a common electrode over the color filters; and forming an alignment layer on the common electrode.

11. The method of claim 10, wherein the alignment layer is formed of a polyimide.

12. The method of claim 10, further comprising forming an oxygen shielding film on the color resist.

* * * * *